US009020111B2

(12) United States Patent
Brewer et al.

(10) Patent No.: US 9,020,111 B2
(45) Date of Patent: Apr. 28, 2015

(54) SETTING UP A COMMUNICATION SESSION WITHIN A WIRELESS COMMUNICATIONS SYSTEM (75) Inventors: Beth Ann Brewer, Canyon Lake, TX (US); David J. Ross, San Diego, CA (US); Eric C. Rosen, Solana Beach, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1320 days.

(21) Appl. No.: 12/471,784

(22) Filed: May 26, 2009

(65) Prior Publication Data

US 2009/0296904 A1    Dec. 3, 2009

Related U.S. Application Data (60) Provisional application No. 61/056,395, filed on May 27, 2008.

(51) Int. Cl.
*H04M 11/00* (2006.01)
*H04W 4/12* (2009.01)
(Continued)

(52) U.S. Cl.
CPC .............. *H04W 4/12* (2013.01); *H04M 3/42042* (2013.01); *H04W 4/10* (2013.01); *H04W 76/005* (2013.01); *H04W 76/02* (2013.01)

(58) Field of Classification Search
CPC .......... H04M 11/00; H04M 3/22; H04M 3/42
USPC ................... 379/93.23, 88.11, 88.23, 142.01, 379/142.04; 455/509
See application file for complete search history.

(56) References Cited

U.S. PATENT DOCUMENTS 6,310,944 B1 * 10/2001 Brisebois et al. ........ 379/142.01
6,516,200 B1   2/2003 Schmidt et al.
(Continued)

FOREIGN PATENT DOCUMENTS

CN    1937665 A     3/2007
JP    H09121256 A   5/1997
(Continued)

OTHER PUBLICATIONS

International Search Report, PCT/US2009/045174, International Searching Authority, European Patent Office, Oct. 1, 2009.
(Continued)

*Primary Examiner* — Fan Tsang
*Assistant Examiner* — Van D Huynh
(74) *Attorney, Agent, or Firm* — Raphael Freiwirth (57) ABSTRACT In an embodiment, an originating communication device within a wireless communications system sends a call request to a server to initiate a communication session with a target communication device, and also sends, along with the call request, a session description request, the session description request requesting alerting data to be sent to the target communication device from the server in addition to a call announce message for announcing the communication session to the at least one target communication device, the alerting data describing a nature of the communication session. The server sends the call announce message and the alerting data to the target communication device. The target communication device receives the call announce message and the alerting data, notifies a user of the target communication device of the announced communication session and outputs the alerting data to the user of the target communication device in conjunction with the notification.

39 Claims, 5 Drawing Sheets (51) Int. Cl.
*H04M 3/42* (2006.01)
*H04W 4/10* (2009.01)
*H04W 76/00* (2009.01)
*H04W 76/02* (2009.01)

(56) References Cited

U.S. PATENT DOCUMENTS

| | | | |
|---|---|---|---|
| 6,771,755 B1 * | 8/2004 | Simpson | 379/142.04 |
| 6,977,993 B2 * | 12/2005 | Starbuck et al. | 379/88.21 |
| 7,415,282 B2 * | 8/2008 | Tillet et al. | 455/509 |
| 7,443,964 B2 * | 10/2008 | Urban et al. | 379/88.23 |
| 2004/0258215 A1 * | 12/2004 | DeVito et al. | 379/88.11 |
| 2007/0297403 A1 | 12/2007 | Semper | |
| 2008/0003999 A1 | 1/2008 | Sung et al. | |
| 2010/0273516 A1 | 10/2010 | Sung et al. | |

FOREIGN PATENT DOCUMENTS

| | | | |
|---|---|---|---|
| JP | 2002-344580 | 11/2002 | |
| JP | 2003209885 A | 7/2003 | |
| JP | 2006140773 A | 6/2006 | |
| JP | 2007536827 T | 12/2007 | |
| JP | 2011-511756 | 4/2011 | |
| KR | 20070025026 A * | 3/2007 | H04M 3/22 |
| KR | 20070117981 A | 12/2007 | |
| WO | 2005109792 A1 | 11/2005 | |
| WO | PCT/US2005/015812 | 11/2005 | |
| WO | 2007142489 | 12/2007 | |
| WO | 2008016524 | 2/2008 | |

OTHER PUBLICATIONS

Written Opinion, PCT/US2009/045174, International Searching Authority, European Patent Office, Oct. 1, 2009.

* cited by examiner

SETTING UP A COMMUNICATION SESSION WITHIN A WIRELESS COMMUNICATIONS SYSTEM

CLAIM OF PRIORITY UNDER 35 U.S.C. §119

The present Application for Patent claims priority to Provisional Application No. 61/056,395, entitled "SYSTEM AND METHOD FOR COMMUNICATING DATA BROADCAST AT A TARGET COMMUNICATION DEVICE UPON AN INITIAL COMMUNICATION BRIDGE ATTEMPT", filed May 27, 2008, which is assigned to the assignee hereof and hereby expressly incorporated by reference herein in its entirety.

BACKGROUND OF THE INVENTION

1. Field of the Invention

Embodiments of the invention relate to setting up a communication session within a wireless communications system.

2. Description of the Related Art

When a synchronous communication is desired between two communication devices, such as a telephone call between two telephones, it is common to have one device attempt to start the communication and bridge the connection by contacting the other device. The contacted device will then broadcast an alert, such as a ring or other audible alert, and can also give a visual alert, such as flashing lights or activity on a display, to inform a person near the device that another communication device is attempting to bridge a communication.

In telephone systems, it is common to send some identification data, often called "caller id" which indicates a caller's number, and other identification data such as the name associated with the calling telephone, during the ringing signal, or when the call is being set up, but before the call is answered. The information made available to the called party may be made visible on a display on the telephone or on a separate attached device. The caller ID information can be manipulated as to the calling number and identity of the calling party, but cannot otherwise be modified to include more data that could provide more data to the user of the called telephone about the nature of the intended call bridge attempt.

There are also specialized telephones and other communication devices, either land-line based telephones or mobile devices, that allow a user to select a specific ringtone or alert for an incoming call based upon the caller id information. This does allow the user of the receiving device to know via the alert mechanism of the phone or other communication device the identity of the caller, but it does not allow the caller to manipulate the ringtone or alert, and does not give any information on the nature of the incoming request to bridge a communication.

SUMMARY

In an embodiment, an originating communication device within a wireless communications system sends a call request to a server to initiate a communication session with a target communication device, and also sends, along with the call request, a session description request, the session description request requesting alerting data to be sent to the target communication device from the server in addition to a call announce message for announcing the communication session to the at least one target communication device, the alerting data describing a nature of the communication session. The server sends the call announce message and the alerting data to the target communication device. The target communication device receives the call announce message and the alerting data, notifies a user of the target communication device of the announced communication session and outputs the alerting data to the user of the target communication device in conjunction with the notification.

DETAILED DESCRIPTION

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The word "exemplary" is used herein to mean "serving as an example, instance, or illustration." Any embodiment described herein as "exemplary" is not necessarily to be construed as preferred or advantageous over other embodiments. Likewise, the term "embodiments of the invention" does not require that all embodiments of the invention include the discussed feature, advantage or mode of operation.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

In this description, the terms "communication device," "wireless device," "wireless communications device," "PTT communication device," "handheld device," "mobile device," and "handset" are used interchangeably. The terms "call" and "communication" are also used interchangeably. The term "application" as used herein is intended to encompass executable and non-executable software files, raw data, aggregated data, patches, and other code segments. The term "exemplary" means that the disclosed element or embodiment is only an example, and does not indicate any preference of user. Further, like numerals refer to like elements throughout the several views, and the articles "a" and "the" includes plural references, unless otherwise specified in the description.

Conventionally, when a call is announced to a target communication device, the target communication device is only informed that a call originator wishes to engaged in a communication session. The user of the target communication device is not necessarily provided with any additional information related to the call at this point. The user can either accept the call and find out more about the communication session, or can reject the call and attempt to find out information related to the call in other ways, such as by texting the calling party and asking what the calling party wanted to speak about. Embodiments of the invention are directed to providing session-description information, or 'alerting data', to the target communication device along with the call announcement message (e.g., which allows the user of the target communication device to make a more informed decision regarding whether to accept the communication session, etc.).

Figure 1:
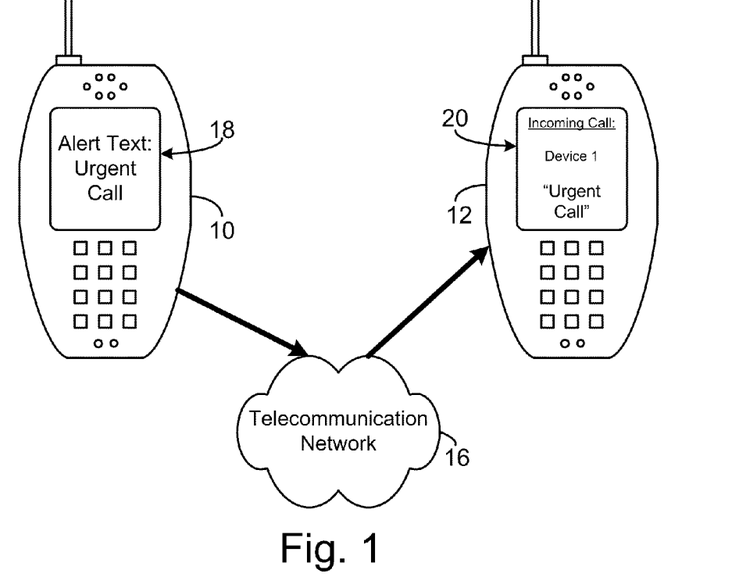
FIG. 1 is a representative diagram of a pair of communication devices, with the originating communication device sending a text message to the target communication device to be displayed with the incoming communication attempt.

For example, FIG. 1 is a representative diagram of a pair of communication devices, shown here as mobile phone 10 and 12, with the originating communication device 10 preparing a text message, as shown on resident display 18, which here is noting that the call is an "Urgent Call." The originating device 10 then sends the text message through a telecommunication network 16 to the target communication device 12 with the initial communication bridge attempt, which here is a voice phone call. The text message is then displayed on the resident display 20 of the target communication device 12 at receipt of the incoming communication attempt. Accordingly, FIG. 1 shows, in an illustrative manner, how an incoming call notification along with alerting data (i.e., "Urgent Call") that describes the nature of the incoming call can be used to permit a called party or target user to make a more informed decision with regard to whether to accept a call.

The alerting data can be text, audio data (such as a talk spurt), specialized ringtones, multimedia or any other data that can provide information to the user of the target device 12 of the nature of the incoming call. As will be described below in more detail with respect to FIGS. 2A and 2B, the alerting data can be included within a call setup message, or alternatively can be stored and indexed within the carrier network such that the call message need only refer to the index of the alerting data to be transmitted to the target device(s) for the communication session.

The telecommunication network 16 can be any fully or partially wired or wireless data or voice network, and does not necessarily require specific modification to permit the transmission of the alerting data. Modification of the originating communication device and target communication device can be used to accomplish the functionality as defined herein. Otherwise, the telecommunication network 16 can be modified to provide a call attempt protocol to provide the alerting data immediately before, during, or after the communication bridge attempt.

As used herein, the term "synchronous communication" is defined as a communication that requires real time, or substantially real time interaction (e.g., either half-duplex or full-duplex interaction) from all communicating parties. Voice communications are one example of synchronous communications, but other data applications and functions can be performed synchronously and utilize the present system and method. Further, the communication devices shown herein, such as mobile phones 10 and 12 are typically not in synchronous communications with each other so the originating device will selectively (typically at the control of the user) attempt to bridge a communication with one or more target devices.

Figure 2A:
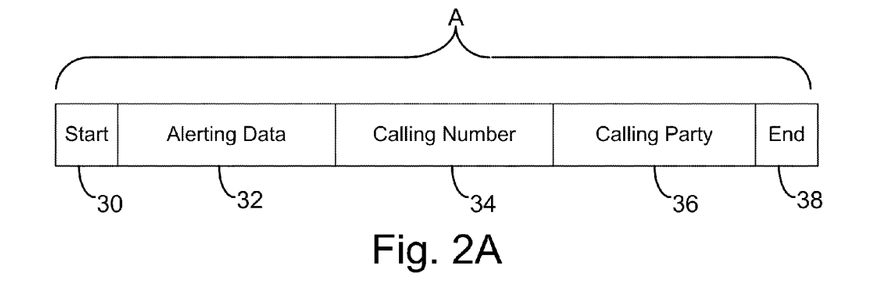
FIG. 2A is one embodiment of a data frame containing the alerting data along with other caller information such that the target communication device will display all information upon full receipt of the data frame.

FIG. 2A is one embodiment of a data frame A containing the alerting data 32 along with other caller information, such as the calling number 34 and the calling party identity 36 such that the target communication device (mobile phone 12) will display all information upon full receipt of the data frame. The data frame include a simple marker for start of frame 30 and end of frame 38 as is common in data frame transmission to ensure data integrity.

Figure 2B:
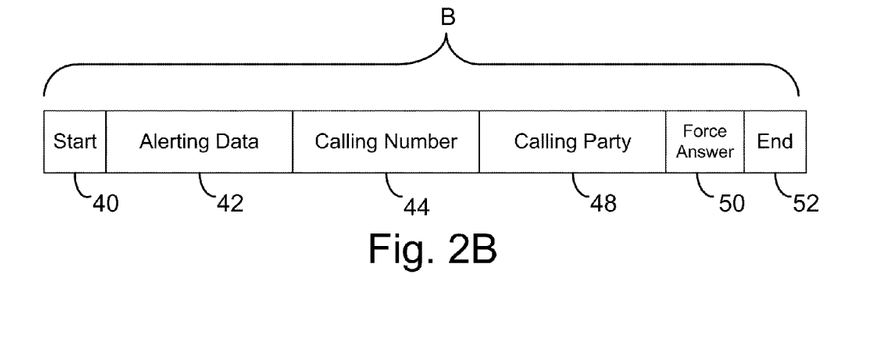
FIG. 2B is one embodiment of a data frame similar to that shown in FIG. 2A, except that this data frame includes instructions for the target communication device to be forced to answer the incoming call after broadcast of the alerting data and display of the other calling information.

FIG. 2B is one embodiment of a data frame B, similar to that shown in data frame A of FIG. 2A, except that data frame B includes forced answer instructions 50 for the target communication device (mobile phone 12) to be forced to answer the incoming call after outputting the alerting data 42 and/or displaying the other calling information, such as calling number 44 and calling party 48. Data frame B likewise includes a simple marker for start of frame 40 and end of frame 52 simply for ease of illustration and is not intended to imply a preference for data frame construction.

Thus, in overview, there is provided a system for communicating data from an originating communication device (mobile phone 10) to a target communication device (mobile phone 12) upon an initial communication bridge attempt, such as a voice call attempt. The system includes an originating communication device, such as mobile phone 10 or other communication device (such as a wired phone, personal digital assistant, mobile or desktop computer platform, etc.) configured to selectively initiate a communication session with (e.g., or attempt to bridge a synchronous communication, such as a voice call, to) one or more target communication devices), and the originating communication device is further configured to selectively transmit alerting data to a target communication device during the communication session initiation attempt. At least one target communication device (such as mobile phone 12), having a user thereof, is configured to selectively allow the alerting data to be outputted (e.g., displayed or played, either audibly and/or visually) to the user thereof upon receipt of the alerting data upon receiving an announce message for announcing the communication session.

As shown in FIG. 1, the originating communication device and target communication device can be wireless communication devices and the communication session initiation attempt can be an attempt to set-up a voice telephone call. As shown in FIG. 1, the target communication device, mobile phone 12, includes a display 20 and the alerting data is media (e.g., text, video, audio, etc.) output at thereon (e.g., displayed on the display 20 to the user of the target communication device, or output via a speaker if the alerting data includes audio, etc.).

In one embodiment, the originating communication device (such as mobile phone 10) can be further configured to selectively force the target communication device (mobile phone 12) to output the alerting data to the end user of the target communication device upon receipt of the alerting data and the call announce message for the communication session. For example, data frame B in FIG. 2B will force the mobile phone 12 to output the alerting data and also to answer the phone call and/or open up a communication channel back to the originating device, whereas data frame A in FIG. 2A forces the output of the alerting data but does not necessarily force the target device or mobile phone 12 to actually accept the announced call. The target communication device can have settings that will allow the user to control whether or not an originating device can force the output of the alerting data or force the bridging of the communication back to the originating device. In other words, the target communication device can override either (i) the forcing of the alerting data output, or (ii) the forcing of the call acceptance. Alternatively, the system can be modified such that the target communication device does not have control over either the outputting of the alerting data (e.g., in case of data frames as in FIGS. 2A and 2B) or the call acceptance (e.g., as in FIG. 2B).

Figure 3:
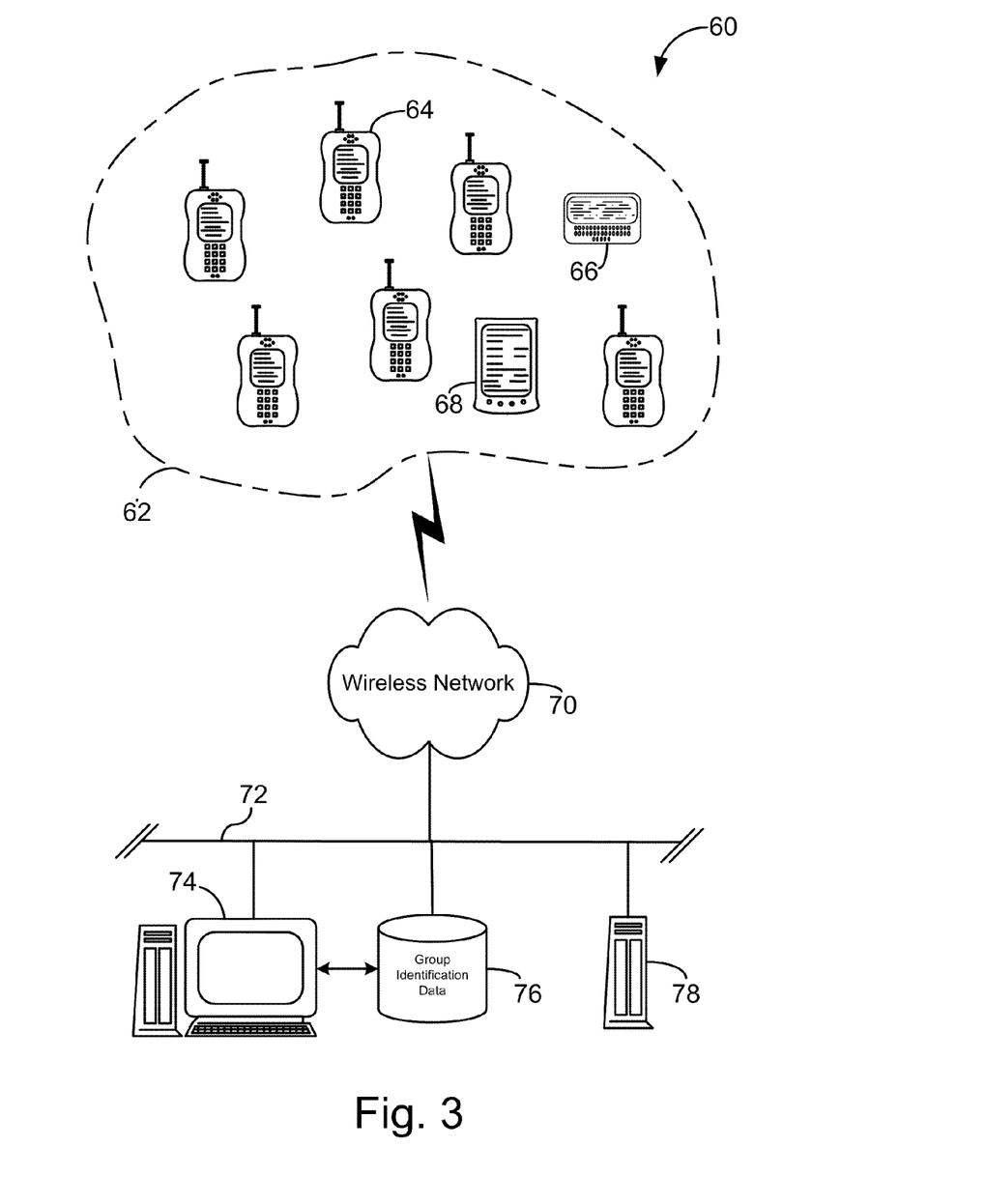
FIG. 3 is a representative diagram of a wireless network with a designated PTT group of wireless telecommunication devices communicating with a group communication server and other computer devices across the wireless network.

FIG. 3 illustrates one embodiment of the system 60 with a group communication server 74 to one or more wireless telecommunication devices in a PTT group 62, such as the wireless telephone 64, smart pager 66 and personal digital assistant (PDA) 68, with other wireless telecommunication devices across a wireless network 70. In the system 60, each wireless telecommunication device 64,66,68 is capable of selectively directly communicating across the wireless communication network 70 with a target set of one or more other wireless telecommunication devices of the plurality. For example, the target set for mobile telephone 64 can be all devices in the communication group 62 or a subset thereof, such as pager 66 and PDA 68.

In this embodiment, a group communication computer device, shown here as server 74, which is present on a server-side LAN 72 across the wireless network 70, to indicate that the wireless device is present, i.e. accessible, on the wireless network 70. The group communication computer device 74 can share this information with the set of target wireless telecommunication devices designated by the first wireless telecommunication device, or can also share it with other computer devices resident on the server-side LAN 72 or accessible across the wireless network 70. The group communication computer device 74 can have an attached or accessible database 76 to store the group identification data for the wireless devices. It should be appreciated that the number of computer components resident on server-side LAN 72, or across the wireless network 70, or Internet generally, is not limited.

The direct communication, such as a PTT communication, can be established through a half-duplex channel between the communicating wireless telecommunication device 64,66,68 and the one or more other wireless telecommunication devices of the target set. The group communication computer device 74 can also inform the wireless telecommunication device 64,66,68 of the inability to bridge a direct communication to the target set 62 if none of the wireless telecommunication devices (or at least one) of the target set have informed the group communication computer device 74 of their presence on the wireless network 70. Further, while the group communication computer device 74 is shown here as having the attached database 76 of group identification data, the group communication computer device 74 can have group identity data resident thereupon, and perform all storage functions described herein.

Thus, in the embodiment shown in FIG. 3, the attempt to initiate the communication session (i.e., to bridge a synchronous communication) is a half-duplex push-to-talk communication attempt from an originating member of a PTT group 62, to multiple target communication devices, such as pager 66 and PDA 68. Each of the target communication devices will then receive the identical alerting data from the originating communication device and output the alerting data (e.g., unless one or more of the target communication devices are embodied so as to disable the forced-output of alerting data). In this embodiment, the bridge attempt is the receipt of the half-duplex communication at the target communication device(s), as opposed to the bridging of a full duplex voice channel back to the originating device. However, the voice or other data carried in the half-duplex transmission from the originating communication device can be delay sensitive (e.g., requiring quick and/or immediate delivery), so the communication bridge attempt is still a synchronous communication.

Also in the embodiment in FIG. 3, there is shown an alerting data database 78 that can be used to send alerting data, such as specialized ringtones, media, etc., to the one or more target communication devices upon an initial communication bridge attempt from the originating communication device to the one or more target communication devices. In this embodiment, the originating communication device (such as mobile phone 64) need not store all media or data that it can use for alerting data, but rather, the originating communication device can interact with the alerting data database 78 to direct the alerting data to be delivered to the target communication device(s). For example, the alerting data fields 32 and/or 42 as shown in FIGS. 2A and 2B can include an index of a desired alerting data stored in the alerting database 78 instead of the actual alerting data to be conveyed to the target communication device(s) in association with the announce message for the communication session. The originating communication device can therefore send information to the target communication device(s) along with the communication bridge attempt (i.e., the announce message) informing the target communication device(s) to expect alerting data from another computer device. Alternatively, the originating communication device can pull data from the alerting data database 78, and can insert the data into the data frame or other data stream such that the originating communication device directs the alerting data database 78 across the wireless network 70 to send data in conjunction with the attempt to communicate with the target communication device.

Although a group communication is typically half-duplex audio conferencing among members of the communication group 62, the group communication can be voice, applications, graphic media, such as pictures in JPEG, TIF, and the like, or audio files such as MP3, MP4, WAV, and the like. The media can also be streaming media, such as a multimedia application (Powerpoint, MOV file, and the like).

Figure 4:
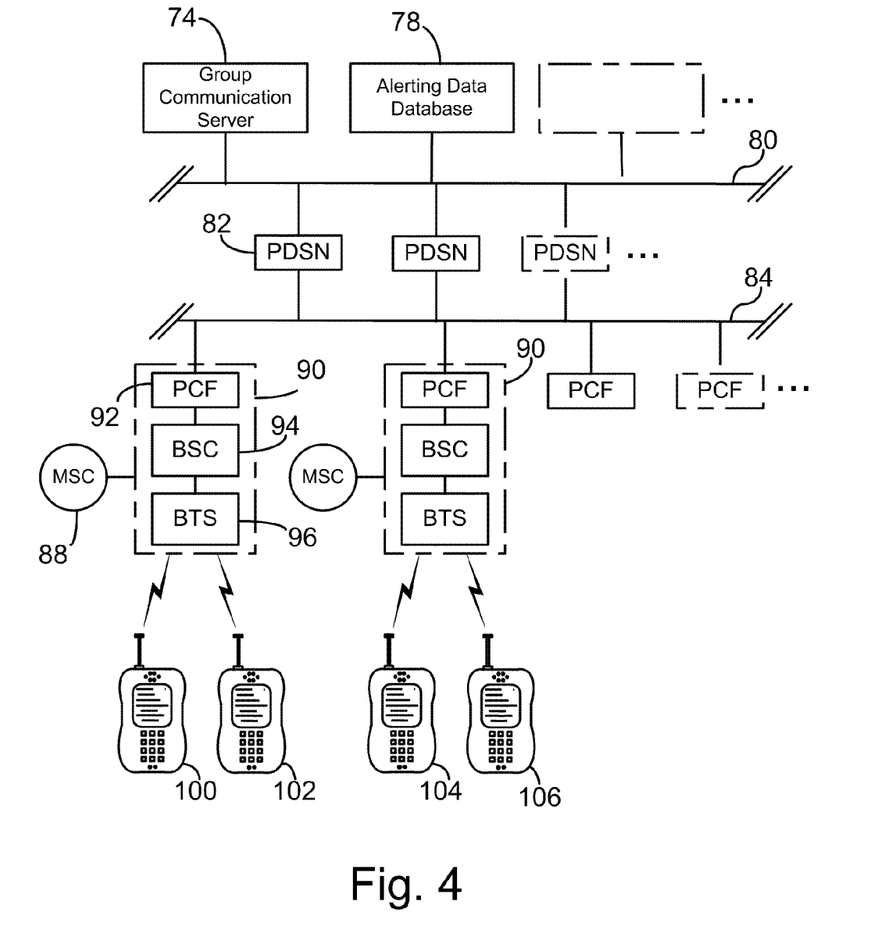
FIG. 4 is a representative diagram of one embodiment of a wireless network in a common cellular telecommunication configuration, having a group communication server control communications between the wireless telecommunication devices of PTT group members.

FIG. 4 is a representative diagram of one embodiment of a wireless network in a common cellular telecommunication configuration, having a series of group communication computer devices (group communication servers) 74 that control communications between the wireless communication devices of set group members (devices 100,102,104,106) in a PTT system. The wireless network is merely exemplary and can include any system whereby remote modules communicate over-the-air between and among each other and/or between and among components of a wireless network 70, including, without limitation, wireless network carriers and/or servers. A series of group communication servers 74 are connected to a group communication server LAN 80. Wireless telephones can request packet data sessions from the group communication server(s) 74 using a data service option. Also, shown on the server LAN 80 is the alerting data database 78 similar to that as described in FIG. 3.

The group communication server(s) 74 are connected to a wireless service provider's packet data service node (PDSN) such as PDSN 82, shown here resident on a carrier network 84. Each PDSN 82 can interface with a base station controller 94 of a base station 90 through a packet control function (PCF) 92. The PCF 92 is typically located in the base station 90. The carrier network 84 controls messages (generally in the form of data packets) sent to a mobile switching center ("MSC") 88. The carrier network 84 communicates with the MSC 88 by a network, the Internet and/or POTS ("plain ordinary telephone system"). Typically, the network or Internet connection between the carrier network 84 and the MSC 88 transfers data, and the POTS transfers voice information. The MSC 88 can be connected to one or more base stations 90. In a similar manner to the carrier network, the MSC 88 is typically connected to the base transceiver station (sometimes referred to as "branch-to-source")(BTS) 96 by both the network and/or Internet for data transfer and POTS for voice information. The BTS 96 ultimately broadcasts and receives messages wirelessly to and from the wireless devices, such as cellular telephones 100,102,104,106, by short messaging service ("SMS"), or other over-the-air methods known in the art. It should also be noted that carrier boundaries and/or PTT operator network boundaries do not inhibit or prohibit the sharing of data as described herein.

Cellular telephones and mobile telecommunication devices, such as wireless telephone 100, are being manufactured with increased computing capabilities and are becoming tantamount to personal computers and hand-held PDAs. These "smart" cellular telephones allow software developers to create software applications that are downloadable and executable on the processor of the wireless device. The wireless device, such as cellular telephone 110, can download many types of applications, such as web pages, applets, MIDlets, games and data. In wireless devices that have designated a communication group 62 (FIG. 3), the wireless communication device can directly connect with the other member of the set and engage in voice and data communication. However, all such direct communications will occur through, or be at the control of, the group communication server 74. In other words, these communication session are server-arbitrated by the group communication server 74. All data packets of the devices do not necessarily have to travel through the group communication computer device 74 itself, but the group communication computer device 74 must be able to ultimately control the communication because it will typically be the only server-side 80 component that is aware of and/or can retrieve the identity of the members of the communication group, or direct the identity of the members of the communication group 62 to another computer device.

Figure 5:
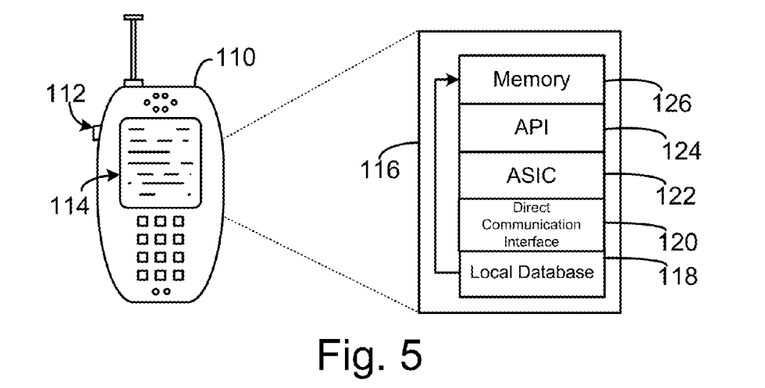
FIG. 5 is a block diagram illustrating the computer platform of the wireless telecommunication device, here shown as embodied with PTT capability.

FIG. 5 is a block diagram illustrating one embodiment of the communication device (originating or target) being a mobile telephone 110 with a PTT button 112 that opens the direct communication to a target set of devices, i.e. other members of the communication group 62. The wireless device 110 is also shown as having a graphics display 114 to the user of the wireless device 110. The wireless device 110 includes a computer platform 116 that can handle voice and data packets, and receive and execute software applications transmitted across the wireless network 70 to include the group communications. The computer platform 116 includes, among other components, an application-specific integrated circuit ("ASIC") 122, or other processor, microprocessor, logic circuit, programmable gate array, or other data processing device. The ASIC 122 is installed at the time of manufacture of the wireless device and is not normally upgradeable. The ASIC 122 or other processor executes an application programming interface ("API") layer 124, which includes the resident application environment, and can include the operating system loaded on the ASIC 122. Resident programs can be held in the memory 126 of the wireless device. An example of a resident application environment is the "binary runtime environment for wireless" (BREW) software developed by QUALCOMM® for wireless device platforms.

As shown here, the wireless device can be a mobile telephone 110, with a graphics display 114, but can also be any wireless device with a computer platform 116 as known in the art, such as a personal digital assistant (PDA), a pager with a graphics display 114, or even a separate computer platform 116 that has a wireless communication portal, and may otherwise have a wired connection to a network or the Internet. Further, the memory 126 can be comprised of read-only memory (ROM) or random-access memory (RAM), EPROM, EEPROM, flash cards, or any memory common to computer platforms. The computer platform 116 can also include a local database 118 for storage of software applications not actively used in memory 126. The local database 118 is typically comprised of one or more flash memory cells, but can be any secondary or tertiary storage device as known in the art, such as magnetic media, EPROM, EEPROM, optical media, tape, or soft or hard disk.

In this embodiment of the wireless device, the computer platform 116 also includes a direct communication interface 120 that can open the direct communication channel from the wireless device (e.g., for a half-duplex voice communication, as in a PTT call). The direct communication interface 120 can also be part of the standard communication interface for the wireless device which ordinarily carries the voice and data transmitted to and from the wireless device. The direct communication interface 120 typically is comprised of hardware as is known in the art.

Figure 6:
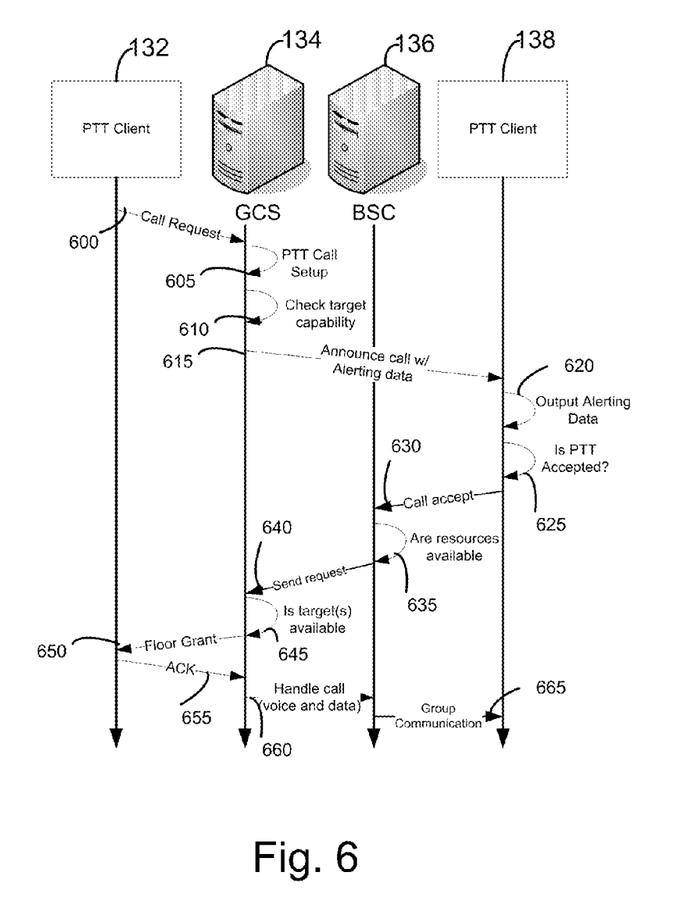
FIG. 6 is a call flow diagram of one embodiment of the originating communication device in a PTT group sending a PTT communication and alerting data to a target communication device.

FIG. 6 is a call flow diagram of one embodiment of the establishment of a PTT communication and a group-directed media transmission between communication group member wireless communication devices. A communicating wireless device, here PTT client 132, requests to establish a direct PTT call with the target devices of the communication group 62, shown here as PTT Client 138, and communicate data session-description request along with the PTT connection request, 600. As used herein, the session-description request corresponds to a request for alerting data to be sent to one or more target devices for the communication session. If the PTT Client 132 sends the actual alerting data to the GCS 134, then the session-description request corresponds to the alerting data itself. Alternatively, if the PTT Client 132 simply refers to alerting data stored at the alerting data database 78, then the session-description request corresponds to the request to send the server-stored alerting data to the target device(s) along with the call announcement message for the communication session.

For example, the session-description request can be communicated along with the call setup request of 600 by configuring the call setup request to include alerting data field 32 as in FIG. 2A, or alternatively by configuring the call setup request to include alerting data field 42 as in FIG. 2B. In a further example, the PTT client 132 can establish a traffic channel (TCH) with a radio access network (RAN), and can then send the call setup request to the GCS 134 via the RAN. The call setup request can contain, for instance, the target user address, a Group application ID, or a request to establish a group. The call setup request may also be sent with a DataoverSignaling (DoS) Access channel message, instead of on a reverse-link TCH.

Referring to FIG. 6, after receiving the call request and alerting data, a Dispatch Call Handler (DCH) at the GCS 134 ("DCH 134") performs the PTT call setup functions, 605, 610, including locating the target, applying call restrictions, and selecting a vocoder. In addition, the DCH 134 notifies the target device (e.g., PTT client 138) that a PTT call is being established with alerting data included, 615. For example, the notification of 615 can correspond to an announce message that packaged within a DoS message that includes a field indicating the alerting data to be conveyed to the target device(s). Alternatively, the alerting data can be sent separate from the announce message, and can even be sent on a different channel from the announce message (e.g., such as a media channel). In another alternative example, the alerting data can be sent concurrently with the announce message (e.g., as would be the case in the event the alerting data is included in the actual announce message), or non-concurrently (e.g., if the alerting data is sent to the PTT client 138 after the announce message is sent).

The target PTT Client 138 will receive the incoming call announcement and alerting data, and verify that the target PTT Client 138 has the resources available to participate in the PTT call. If the target PTT Client 138 determines sufficient resources are available to support the PTT call, the target PTT Client 138 outputs the alerting data (e.g., if embodied to do so automatically), 620. For purposes of illustration here, it is assumed that the target PTT client 138 does have resources available. Next, the PTT Client 138 determines whether to accept the call, 625. For example, if the call message of 600 included a "Force Answer" field 50 as in FIG. 2B, then the PTT Client 138 automatically accepts the call unless the PTT Client 138 has disabled forced-call answering. Otherwise, if a forced answer is not requested by the call announce message, then a user of the PTT Client 138 determine whether to accept the call, 625. In either case, assume that the PTT Client 138 determines to accept the call in 625, and thereby sends a call accept message, 630.

Once the call accept message is received from the target PTT Client 138 at the DCH 134 or GCS 134, the BSC 136 determines whether sufficient resources are available for supporting the communication session, 635. If sufficient resources are determined to be available, the BSC 136 sends a floor grant message to the DCH 134 indicating the status of the target wireless device, 640. The DCH 134 determines if the target device is available, 645, and if so, sends the floor grant to the originating PTT Client 132, 650, which indicates the call is being established and the PTT Client 132 can start talking (often with an audible "beep" to the user of the device). The PTT Client 132 acknowledges the floor grant message and begins forwarding media for the PTT communication, 655. The DCH 134 processes the media from the PTT client 132 and forwards the media to the BSC 136, 660, for transmission to each target device (e.g., PTT Client 138, etc.) that has joined the communication session, 665.

Figure 7:
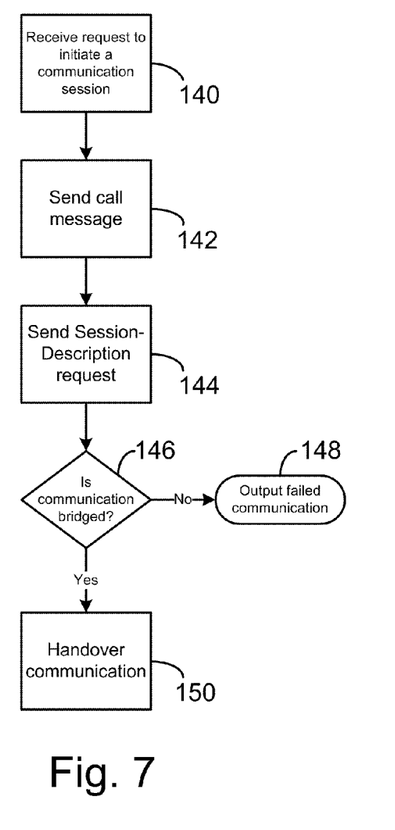
FIG. 7 is a flowchart of one embodiment of the process of the originating communication device sending alerting data along with the initial communication bridge attempt to a target communication device.

FIG. 7 is a flowchart of one embodiment of the process of the originating communication device (mobile phone 10) sending alerting data along with the initial communication bridge attempt (i.e., a communication session initiation attempt) to a target communication device (mobile phone 12). A request is received to attempt to bridge a communication with the target device (e.g., a user of the mobile phone 10 presses a PTT button, etc.), 140, and then the originating communication device sends the call message to the GCS 134,142. For example, the initial bridge attempt of 142 may correspond to the mobile phone 10 bringing up a TCH and then sending a call message to the GCS 134 to initiate a server-arbitrated communication session. A session-description request is then sent to the GCS 134 to request that alerting data be sent to the target communication device(s), 144. As noted above, the session-description request can either include the actual alerting data to be forwarded to the target communication device(s), or can alternatively refer to alerting data stored at the alerting data database 78. Also, the session-description request can be included within the call message associated with the initial bridge attempt 142, or can be sent to the GCS 134 separately. It should be noted that the transmission of the session-description request and call message can be performed in other sequences as long as the target communication device(s) can receive the alerting data in sufficient time to output the alerting data along with the notification of the incoming communication attempt to the user(s) of the target communication device(s) (i.e., the call announce message). Also, as noted above, if the originating communication device is so embodied to work in conjunction with an alerting data database 78, step 144 is directing the alerting data database 78 to send the alerting data to the target communication device(s). Thus, the alerting data need not actually be transmitted from the originating communication device, but in at least one embodiment the origination communication device can rather provide an indication of alerting data stored at the alerting data database 78 that is to be sent to the target communication device(s).

A determination is then made, after sending the alerting data at step 144, as to whether the communication has been bridged, as shown at decision 146 (e.g., whether the call has been answered or accepted, whether the PTT voice stream been delivered, etc.). If the communication has not been bridged at decision 146, then a failed communication is output and the process terminates, as shown at termination 148. Otherwise, if the communication is bridged at decision 146, then the communication is bridged and the process is handed over to the communication control of the origination communication device, as shown at step 150. Alternately, if embodied as a PTT communication, once delivery of PTT voice stream is accomplished at decision 146, the process will terminate at step 150 as there is not a current open communication channel present.

Figure 8:
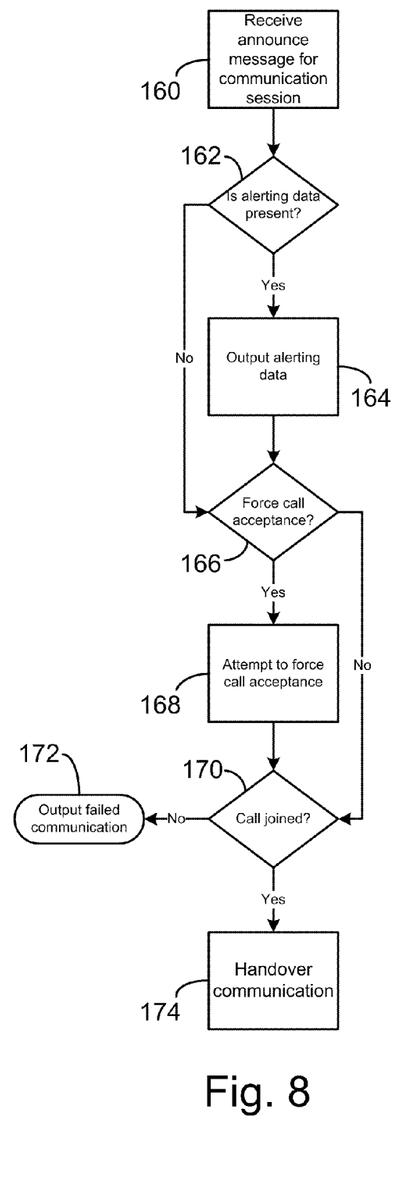
FIG. 8 is a flowchart of one embodiment of the process at a target wireless communication device interacting with the originating communication device of FIG. 7, where the target communication device broadcasts the alerting data, and will force an immediate communication bridge back to the originating communication device if requested.

FIG. 8 is a flowchart of one embodiment of the process at a target wireless communication device (such as mobile phone 12) interacting with the originating communication device of FIG. 7. An incoming communication request (e.g., an announce message) is received at step 160. The target wireless communication device then makes a determination as to whether alerting data is received in association with the incoming communication request, as shown at decision 162 (e.g., either within the call announce message, or separate from the call announce message). For example, the call announce message may be received first, such that a call notification (e.g., a ringtone) is playing on the target wireless communication device. At this point, the alerting data may be received (e.g., on a separate channel, such as a media channel). The alerting data can, for example, be an additional indication (e.g., a separate ringtone, message, picture, etc.) that describes the nature of the call being announced (e.g., indicating the call is important, etc.). If alerting data is present at decision 162, then the alerting data is output (e.g., displayed or played, such as in an audio or visual format) at the target communication device, as shown at 164. Otherwise, if alerting data was not present at decision 162, or after the output of any alerting data at step 164, a determination is then made as to whether a request to force call acceptance is present within the announce message of 160, as shown at decision 166.

If a request to force call acceptance is present at decision 166, then the target communication device will attempt to accept the call, 168 (e.g., by sending an announce ACK (accept) message). Otherwise, if there is no request to force call acceptance at 166, or after the attempted forced joinder to the call at 168, a determination is then made as to whether the communication has been bridged (i.e., whether the target device has joined the call), either by voluntarily answering the announce message or from forcing at 168, as shown at decision 170. If the communication session is not joined at decision 170, then the process outputs a failed communication error and terminates as shown at termination 172. Otherwise, if the communication session is joined at decision 170, the communication session is handed over to the communication control of the target wireless device, as shown at 174. Alternatively, if the synchronous communication desired is a PTT communication, a return duplex communication can still be forced at decision 166, and step 174 could still be necessary if the half-duplex channel is turned into a full-duplex communication channel.

It can thus be seen that system 60 provides an inventive method for communicating alerting data from an originating communication device (such as mobile phone 64) to a target communication device (such as PDA 68) during setup of a communication session, with the steps of attempting to bridge a synchronous communication (such as voice call, PTT communication, data connection, and the like) from an originating communication device 64 to one or more target communication devices (such as pager 66, PDA 68), and then selectively transmitting alerting data from the session arbitrator to the one or more target communication devices upon attempting to bridge the synchronous communication thereto, and outputting the alerting data to a user of the target communication device upon receipt of the alerting data at an initial communication bridge attempt from the originating communication device. If the originating communication device and target communication device are wireless communication devices, such as mobile phones 10 and 12, attempting to bridge a synchronous communication is attempting to bridge a wireless communication channel, such as a voice traffic channel, as is necessary for a telephone call. If embodied in a PTT communication system as shown in FIGS. 3 and 4, attempting to bridge a synchronous communication is a half-duplex push-to-talk communication attempt.

If the alerting data includes video media, outputting the alerting data includes displaying the media on a display of the target communication device (mobile device 12) to the user thereof. If the alerting data includes audio media, outputting the alerting data includes playing the media on a speaker of the target communication device (mobile device 12) to the user thereof. As shown in FIG. 1, if the alerting data includes text sent from the originating communication device (mobile phone 10), outputting the alerting data includes displaying the text on a display 20 of the target communication device (mobile phone 12) to the user thereof.

Accordingly, in an embodiment of the invention, the target communication device can be forced to output the alerting data to the end user of the target device upon receipt of the alerting data upon an initial communication bridge attempt from the originating communication device. By contrast, conventional target communication devices typically play a ringtone and if a target user determines not to accept the call, any associated media is either not received or not output at the target communication device. An embodiment of the invention can also include forcing the target communication device to bridge the synchronous communication to the originating communication device (i.e., to accept the call), such as through receipt of data frame B in FIG. 2B, and in the target communication device executing the process of FIG. 8. And as shown in FIGS. 3 and 4, an embodiment of the invention can include sending the alerting data to the target communication device from another computer device, such as alerting data database 78, upon an initial communication bridge attempt from the originating communication device.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method of setting up a communication session arbitrated by a given server at an originating communication device within a wireless communications system, comprising:
   sending a full-duplex call request in a half-duplex message to the given server to initiate a full-duplex communication session with at least one target communication device; and
   sending, along with the full-duplex call request in the half-duplex message, a session description request in half-duplex, the session description request requesting alerting data to be sent in half-duplex to the at least one target communication device from the given server in addition to the full-duplex call request in the half-duplex message for requesting the full-duplex communication session to the at least one target communication device, the alerting data describing a nature of the requested full-duplex communication session, and wherein the session description request comprises a forced answer data instruction configured to force the at least one target communication device to accept the full-duplex call request.

2. The method of claim 1, wherein the session description request either (i) includes the alerting data to be sent to the at least one target communication device along with the full-duplex call request in the half-duplex message, or (ii) references the alerting data accessible to the given server to request that the alerting data be sent to the at least one target communication device along with the full-duplex call request in the half-duplex message.

3. The method of claim 1, wherein the alerting data corresponds to one of: text media, audio media, and video media.

4. The method of claim 1, wherein the alerting data is configured to facilitate a user of the at least one target communication device to accept the full-duplex call request.

5. A method of setting up a communication session arbitrated by a given server within a wireless communications system, comprising:
   receiving a full-duplex call request in a half-duplex message, from an originating communication device, to initiate a full-duplex communication session between the originating communication device and at least one target communication device;
   receiving, along with the full-duplex call request in the half-duplex message, a session description request in half-duplex, the session description request requesting alerting data to be sent in half-duplex to the at least one target communication device, the alerting data describing a nature of the requested full-duplex communication session, and wherein the session description request comprises a forced answer data instruction configured to force the at least one target communication device to accept the full-duplex call request after outputting the alerting data; and
   sending the full-duplex call request, the forced answer data istruction, and the alerting data to the at least one target communication device in a half duplex message.

6. The method of claim 5, wherein the alerting data corresponds to one of: text media, audio media and video media.

7. The method of claim 5, wherein the session description request either (i) includes the alerting data to be sent to the at least one target communication device along with the full-duplex call request in the half-duplex message, or (ii) references the alerting data accessible to the given server to request that the alerting data be sent to the at least one target communication device along with the full-duplex call request in the half-duplex message.

8. The method of claim 7, wherein, if the session description request references the alerting data accessible to the given server, further comprising:
   retrieving the alerting data from a network storage location.

9. The method of claim 5, wherein the alerting data is not included within the full-duplex call request.

10. The method of claim 9, wherein sending the full-duplex call request, the forced answer data instruction, and the alerting data to the at least one target communication device in a half-duplex message comprises sending the alerting data after the full-duplex call request.

11. The method of claim 5, wherein sending the full-duplex call request, the forced answer data instruction, and the alerting data to the at least one target communication device in a half-duplex message comprises sending the alerting data on a first channel and the full-duplex call request on a second channel.

12. The method of claim 11, wherein the first channel corresponds to a media channel.

13. The method of claim 5, wherein sending the full-duplex call request, the forced answer data instruction, and the alerting data to the at least one target communication device in a half-duplex message comprises sending the alerting data and the full-duplex call request concurrently.

14. The method of claim 13, wherein the alerting data is included within the full-duplex call request.

15. The method of claim 5, wherein the alerting data is configured to facilitate a user of the at least one target communication device to accept the full-duplex call request.

16. A method of setting up a communication session arbitrated by a given server at a target communication device within a wireless communications system, comprising:
   receiving a full-duplex call request in a half-duplex message, from the given server, that requests a full-duplex communication session that was originated by an originating communication device;
   receiving, along with the full-duplex call request in the half-duplex message, alerting data in half-duplex associated with the requested full-duplex communication session, the alerting data describing a nature of the requested full-duplex communication session;
   receiving, along with the full-duplex call request in the half-duplex message, a forced answer data instruction configured to force the target communication device to accept the full-duplex call request after outputting the alerting data;
   notifying a user of the target communication device of the requested full-duplex communication session; and outputting the half-duplex alerting data to the user of the target communication device in conjunction with the notification.

17. The method of claim 16, wherein the alerting data cooresponds to one of: text media audio and video media.

18. The method of claim 16, wherein the alerting data is not included within the full-duplex call request.

19. The method of claim 18, wherein the alerting data is received after the full-duplex call request.

20. The method of claim 16, wherein the alerting data is received on a first channel and the full-duplex call request is received on a second channel.

21. The method of claim 20, wherein the first channel cooresponds to a media channel.

22. The method of claim 16, wherein the alerting data and the full-duplex call request are received concurrently.

23. The method of claim 22, wherein the alerting data is included within the full-duplex call request.

24. The method of claim 16, wherein the alerting data is configured to facilitate a user of the target communication device to accept the full-duplex call request.

25. An originating communication device configured to initiate a communication session arbitrated by a given server within a wireless communications system, comprising:
means for sending a full-duplex call request in a half-duplex message to the given server to initiate a full-duplex communication session with at least one target communication device;
and
means for sending, along with the full-duplex call request in the half-duplex message, a session description request in half-duplex, the session description request requesting alerting data to be sent in half duplex to the at least one target communication device from the given server in addition to the full-duplex call request in the half-duplex message for requesting the communication session to the at least one target communication device, the alerting data describing a nature of the communication session, and wherein the session description request comprises a forced answer data instruction configured to force the at least one target communication device to accept the full-duplex call request after outputting the alerting data.

26. The communication device of claim 25, wherein the session description request either (i) includes the alerting data to be sent to the at least one target communication device along with the full-duplex call request in the half-duplex message, or (ii) references the alerting data accessible to the given server to request that the alerting data be sent to the at least one target communication device along with the full-duplex call request in the half-duplex message.

27. A server configured to arbitrate a communication session within a wireless communications system, comprising:
means for receiving a full-duplex call request in a half-duplex message, from an originating communication device, to initiate a full-duplex communication session between the originating communication device and at least one target communication device;
means for receiving, along with the full-duplex call request in the half duplex message, a session description request in half-duplex, the session description request requesting alerting data to be sent in half-duplex to the at least one target communication device, the alerting data describing a nature of the requested full-duplex communication session, and wherein the session description request comprises a forced answer data instruction configured to force the at least one target communication device to accept the full-duplex call request after outputting the alerting data;
means for sending in half duplex the full-duplex call request, the forced answer data instruction, and the alerting data to the at least one target communication device in a half-duplex message.

28. The server of claim 27, wherein the session description request either (i) includes the alerting data to be sent to the at least one target communication device along with the full-duplex call request in the half-duplex message, or (ii) references the alerting data accessible to the server to request that the alerting data be sent to the at least one target communication device along with the full-duplex call request in the half-duplex message.

29. A target communication device configured to participate in a communication session arbitrated by a given server within a wireless communications system, comprising:
means for receiving a full-duplex call request message in a half-duplex message, from the given server, that requests a full-duplex communication session that was originated by an originating communication device;
means for receiving, along with the full-duplex call request in the half-duplex message, alerting data in half-duplex associated with the requested full-duplex communication session, the alerting data describing a nature of the requesting full-duplex communication session;
means for receiving, along with the full-duplex call request in the half-duplex message, a forced answer data instruction configured to force the target communication device to accept the full-duplex call request after outputting the alerting data; and
means for notifying a user of the target communication device of the requested full-duplex communication session; and
means for outputting the half-duplex alerting data to the user of the target communication device in conjunction with the notification.

30. An originating communication device configured to initiate a communication session arbitrated by a given server within a wireless communications system, comprising:
a processor configured with software instructions to perform operations comprising:
sending a full-duplex call request in a half-duplex message to the given server to initiate a full-duplex communication session with at least one target communication device; and
sending, along with the full-duplex call request in the half-duplex message, a session description request in half-duplex, the session description request requesting alerting data to be sent in half-duplex to the at least one target communication device from the given server in addition to the full-duplex call request message in the half- duplex message for requesting the full-duplex communication session to the at least one target communication device, the half-duplex alerting data describing a nature of the requested full-duplex communication session, and wherein the session description request comprises a forced answer data instruction configured to force the at least one target communication device to accept the full-duplex call request after outputting the alerting data.

31. The communication device of claim 30, wherein the session description request either (i) includes the alerting data to be sent to the at least one target communication device along with the full-duplex call request in the half-duplex message, or (ii) references the alerting data accessible to the given server to request that the alerting data be sent to the at least one target communication device along with the full-duplex call request in the half-duplex message.

32. A server configured to arbitrate a communication session within a wireless communications system, comprising:
 a server processor configured with software instructions to perform operations comprising:
  receiving a full-duplex call request in a half-duplex message, from an originating communication device, to initiate a full-duplex communication session between the originating communication device and at least one target communication device;
  receiving, along with the full-duplex call request in the half-duplex message, a session description request in half-duplex, the session description request requesting alerting data to be sent in half-duplex to the at least one target communication device, the alerting data describing a nature of the requested full-duplex communication session call, and wherein the session description request comprises a forced answer data instruction configured to force the at least one target communication device to accept the full-duplex call request after outputting the alerting data; and
  sending the full-duplex call request, the forced answer data instruction, and the alerting data to the at least one target communication device in a half-duplex message.

33. The server of claim 32, wherein the session description request either (i) includes the alerting data to be sent to the at least one target communication device along with the full-duplex call request in the half-duplex message, or (ii) references the alerting data accessible to the server to request that the alerting data be sent to the at least one target communication device along with the full-duplex call request in the half-duplex message.

34. A target communication device configured to participate in a communication session arbitrated by a given server within a wireless communications system, comprising:
 a processor configured with software instructions to perform operations comprising:
  receiving a full-duplex call request in a half-duplex message, from the given server, that requests a full-duplex communication session that was originated by an originating communication device;
  receiving, along with the full-duplex call request age in the half-duplex message, alerting data in half-duplex associated with the requested full-duplex communication session, the alerting data describing a nature of the requested full-duplex communication session;
  receiving, along with the full-duplex call request in the half-duplex message, a forced answer data instruction configured to force the target communication device to accept the full-duplex call request after outputting the alerting data; and
  notifying a user of the target communication device of the requested full-duplex communication session; and
  outputting the half-duplex alerting data to the user of the target communication device in conjunction with the notification.

35. A non-transitory computer-readable storage medium having stored thereon processor-executable instructions configured to cause a processor of an originating communication device to perform operations comprising:
 sending a full-duplex call request in a half-duplex message to a given server to initiate a full-duplex communication session with at least one target communication device; and
 sending, along with the full-duplex call request in the half-duplex message, a session description request in half-duplex, the session description request requesting alerting data to be sent in half-duplex to the at least one target communication device from the given server in addition to the full-duplex call request message in the half-duplex message for requesting the full-duplex communication session to the at least one target communication device, the alerting data describing a nature of the requested full-duplex communication session, and wherein the session description request comprises a forced answer data instruction configured to force the at least one target communication device to accept the full-duplex call request after outputting the alerting data.

36. The non-transitory computer-readable storage medium of claim 35, wherein the session description request either (i) includes the alerting data to be sent to the at least one target communication device along with the full-duplex call request in the half-duplex message, or (ii) references the alerting data accessible to the given server to request that the alerting data be sent to the at least one target communication device along with the full-duplex call request in the half-duplex message.

37. A non-transitory computer-readable storage medium wherein the stored processor-executable instructions are configured to cause a processor of a server to perform operations comprising:
 receiving a full-duplex call request in a half-duplex message, from an originating communication device, to initiate a full-duplex communication session between the originating communication device and at least one target communication device;
 receiving, along with the full-duplex call request in the half-duplex message, a session description request in half-duplex, the session description request requesting alerting data to be sent in half-duplex to the at least one target communication device, the alerting data describing a nature of the full-duplex communication session, and wherein the session description request comprises a forced answer data instruction configured to force the at least one target communication device to accept the full-duplex call request after outputting the alerting data; and
 sending the full-duplex call request, the forced answer data instruction, and the alerting data to the at least one target communication device in a half-duplex message.

38. The non-transitory computer-readable storage medium of claim 37, wherein the session description request either (i) includes the alerting data to be sent to the at least one target communication device along with the full-duplex call request in the half-duplex message, or (ii) references the alerting data accessible to the server to request that the alerting data be sent to the at least one target communication device along with the full-duplex call request in the half-duplex message.

39. A non-transitory computer-readable storage medium having stored thereon processor-executable instructions configured to cause a processor of a target communication device to perform operations comprising:
 receiving a full-duplex call request in a half-duplex message, from a given server, that requests a full-duplex communication session that was originated by an originating communication device;

receiving, along with the full-duplex call request in the half-duplex message, alerting data in half-duplex associated with the requested full-duplex communication session, the alerting data describing a nature of the requested full-duplex communication session;

receiving, along with the full-duplex call request in the half-duplex message, a forced answer data instruction configured to force the target communication device to accept the full-duplex call request after outputting the alerting data; and notifying a user of the target communication device of the requested full-duplex communication session; and outputting the half-duplex alerting data to the user of the target communication device in conjunction with the notification.

* * * * *